(12) United States Patent
Duncan

(10) Patent No.: US 6,312,652 B1
(45) Date of Patent: *Nov. 6, 2001

(54) CERAMIC DIP PIPE AND TUBE REACTOR FOR ETHYLENE PRODUCTION

(75) Inventor: Dennis A. Duncan, Texas City, TX (US)

(73) Assignee: Stone & Webster Engineering Corp., Boston, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,334

(22) Filed: Sep. 19, 1997

(51) Int. Cl.⁷ .............................. B01J 10/00; F28D 7/00
(52) U.S. Cl. ........................ 422/201; 422/197; 585/920
(58) Field of Search ................... 422/201, 240, 422/241, 198, 200, 202, 197, 187; 585/403, 636, 920, 537

(56) References Cited

U.S. PATENT DOCUMENTS

| | | | |
|---|---|---|---|
| 2,671,198 | 3/1954 | Beverly | 324/653 |
| 2,708,621 * | 5/1955 | Shapleigh | 422/198 |
| 2,897,063 | 7/1959 | Breier | 422/224 |
| 3,453,087 | 7/1969 | Herp et al. | 422/197 |
| 3,945,805 * | 3/1976 | Costello et al. | 422/208 |
| 4,342,642 | 8/1982 | Bauer et al. | 208/130 |
| 4,440,727 * | 4/1984 | Bruck | 422/197 |
| 4,780,196 * | 10/1988 | Alagy et al. | 208/130 |
| 5,254,318 | 10/1993 | Williams et al. | 422/197 |
| 5,552,039 | 9/1996 | McBrayer, Jr. et al. | 210/90 |

* cited by examiner

Primary Examiner—Marian C. Knode
Assistant Examiner—Alexa A. Dorosher
(74) Attorney, Agent, or Firm—Akin, Gump, Strauss, Hauer & Feld, L.L.P.

(57) ABSTRACT

A furnace construction for cracking of saturated hydrocarbon feed stocks to olefinic product mixtures, wherein the reaction lines of such furnace are fabricated of a ceramic refractory feed inlet pipe coaxially located with a ceramic refractory tube to define an annular space there between which in part is located without and within the radiant heating firebox volume of such furnace, this to provide for a zone wherein hot cracked olefin product gas is quenched in temperature in such annular space outside of such firebox and a cracking zone within the firebox within which hydrocarbon feed is cracked to an olefin containing product gas composition. The ceramic refractory material construction permits of such pipe-tube reaction line structure to be exposed to a much greater heat/temperature content of which the firebox is capable than reaction lines of metallic construction. Cracking predominantly occurs within the annular space, meaning that the cylindrical ceramic refractory structures may be of diameters sufficient to provide for high strength structures. The greater firebox temperatures permitted with a refractory allows for the use of a shorter reaction line structure.

2 Claims, 3 Drawing Sheets

CERAMIC DIP PIPE AND TUBE REACTOR FOR ETHYLENE PRODUCTION

STATEMENT REGARDING FEDERALLY SPONSORED RESEARCH

This invention was in part produced through funding under a U.S. Government sponsored program (Contract No. DE-FC02-88ID12797) and the United States Government has certain rights therein.

CROSS-REFERENCE TO RELATED APPLICATIONS

Not Applicable.

BACKGROUND OF THE INVENTION

Steam cracking furnaces have long been used to crack a variety of hydrocarbon feedstocks to ethylene and other valuable olefinic gases. For the past 20 or 30 years cracking at short residence time and high temperature has been favored for its beneficial effect on selectivity to ethylene. Basic designs of such short residence time-high temperature steam cracking furnaces are illustrated by U.S. Pat. No. 2,671,198 (dated Jun. 20, 1972) and U.S. Pat. No. 4,342,642 (dated Aug. 3, 1982).

When thermally cracking a saturated hydrocarbon down to olefinic hydrocarbons—such as the cracking of ethane to predominantly ethylene or the cracking of heavier saturated hydrocarbons like those comprising a naphtha or gas oil feedstock down to ethylene and other higher olefins—in order to maximize the conversion and the selectivity of such cracking conversion of the saturated hydrocarbon feedstock into ethylene, it is desirable to input that quantity of heat (Q) needed to effect cracking of the saturated hydrocarbon feed very rapidly while minimizing the time that the initial cracking product—namely, ethylene—is exposed to this quantity of cracking heat. To fast crack the saturated hydrocarbon feed to ethylene and then quickly remove this so formed ethylene from this high heat environment maximizes the final yield of ethylene for the degree of conversion obtained. This then is the concept that underlies the millisecond residence time at a high temperature which is now the preferred mode for furnace cracking of saturated hydrocarbon feeds to olefin products.

A steam cracking furnace comprises a refractory lined firebox containing a multiplicity of high alloy metal cracking lines through the interior passage of which flows the hydrocarbon feedstock to be cracked, together with a suitable amount of diluting steam. The sensible heat and the heat of cracking are supplied by burners located on the floor and/or walls of the firebox and this heat transfers through the metallic materials of these reaction lines into the hydrocarbon feedstock that flows there-within. A metallic cracking line can be as long as 400 feet and coiled in a serpentine shape that runs vertically up and down in the firebox, or it may be as short as 40 feet in a straight single pass through the firebox, such as the design described in the U.S. Pat. No. 4,342,642 cited above.

Cracking furnaces, as constructed today, provide for millisecond residence time at high temperatures and are, with respect to their radiant heating cracking reaction lines, constructed of metallic materials. The fireboxes themselves, since these are lined with refractory materials, are capable of delivering a greater heat load than the metallic materials of the radiant cracking reaction lines located within the firebox can withstand. This maximum service temperature of the metallic materials of which the cracking reaction lines are constructed then dictates a long line in order to accomplish the desired quantity of heat (Q) input into the hydrocarbon mass flow therethrough for that short (milliseconds) time of residence of this hydrocarbon mass within the metallic cracking reaction line. Either this, or the time of residence of the hydrocarbon mass, including its ethylene content, within the metallic reaction cracking line must be increased.

Given the extreme conditions to which the materials of the cracking reaction lines are exposed in a thermal cracking operation—which involve thermal expansion and contractions of such materials as they are suspended within the firebox which radiantly heats them—to date, metallic materials have been regarded as the only materials practical for construction of such cracking lines. The strength and serviceability dictated by the dimensions required by a cracking line in order to achieve the needed rapid transfer of heat to accomplish the level and degree of cracking desired within the short residence times that are desired have, here to date, dictated the use of metallic materials for their construction.

SUMMARY OF THE INVENTION

The reaction lines of the cracking furnace of this invention comprise an inlet pipe coaxially located by suspension within a tube, both the inlet pipe and the outerly position coaxially located tube being constructed of a ceramic refractory material, wherein the lower open end of the ceramic inlet pipe is spaced apart from the lower closed end of the outerly position coaxially located ceramic tube. This reaction line construction is, by suspension means, positioned such that in part of its entire length a portion of the pipe and tube coaxial structure is located outside of the radiant heating volume of the firebox and the remaining length of the pipe and tube coaxial structure comprising this entire reaction line structure is located and suspended within the radiant heating volume of the furnace firebox.

A mixture of saturated hydrocarbon feedstock, as preheated to an appropriate temperature in a convection section of the furnace, and superheated dilution steam as formed in such convection section and brought into combination with the saturated hydrocarbon feedstock, is passed as a saturated hydrocarbon-steam diluted feedstock to the interior of said ceramic refractory inlet pipe and passes therethrough to the lower open end of such pipe at which point, because of the closed lower end of the outerly position coaxially located ceramic refractory tube, the flow of hydrocarbon-steam feed reverses in direction to flow upwardly within an annular space defined by the exterior surface of the inlet pipe and the interior surface of the outwardly coaxially position ceramic refractory tube. At that surface of the firebox structure which differentiates between the interior radiant heating volume of the firebox and the area exterior of this fire box, the hydrocarbon mass flow within the annular space between the exterior tube and interiorly located inlet pipe is at substantially its maximum heat content—hence temperature. As hydrocarbon flow continues upwardly in this annular space which is exterior of the firebox volume, heat is transferred from this reacted hydrocarbon mass to that preheated hydrocarbon-steam feed flowing downwardly through the interior passageway of the inlet pipe. This zone is the quenching zone of the pipe-tube structure, and in this quenching zone heat transfer from the annular space reacted hydrocarbon mass which at a high heat content/temperature level to the lower heat content/temperature level hydrocarbon mass flow within the inlet pipe increases the heat content/temperature level of the inputed preheated hydrocarbon-steam feed flow within the inlet pipe.

This further prepares the input hydrocarbon for and/or begins a partial cracking of this hydrocarbon-steam feed to better condition it for final cracking. Within the radiant heating volume of the furnace firebox of the furnace, that hydrocarbon-steam content flowing down and through the inlet pipe undergoes a further infusion of heat during its course of transit to the lower end of the inlet pipe and flow direction reversal to then transit upwardly through the annular space between the exterior tube and interior pipe. Within the flow length of this annular space the hydrocarbon mass flow undergoes its maximum heat input, this because the exterior of the outwardly posited coaxially located tube is exposed to the radiant and other heating produced by the floor and/or wall mounted burners operating within the radiant heating volume of the furnace firebox. It is within this annular space that cracking of the feed saturated hydrocarbon to olefin products, first being ethylene, predominantly occurs.

Since the tube and inlet pipe of this reaction line structure, both being of a ceramic refractory material, have much greater maximum service temperature than reaction lines of a metallic construction, the ceramic materials may be and are exposed to a much greater heat content/firebox temperature—by hundreds of BTUs and/or degrees. This provides for a significantly greater transfer of heat (Q) per unit time (T) to the hydrocarbon mass flow within this annular space of the ceramic tube-pipe reaction line structure than that which is possible with a reaction line of a metallic structure.

Accordingly, with a reaction line of a ceramic refractory material construction as per this invention via its interior inlet dip pipe—exterior tube construction, which can be and are exposed to a much greater firebox heat/temperature content, the residence time of the hydrocarbon feed within the cracking zone may be maintained on a short order—milliseconds—while adequate heat is transferred thereto for cracking, all while the length of such reaction line structure is significantly shorter in comparison to reaction lines of a metallic construction. This then significantly reduces the size, hence cost, of the firebox need for servicing such reaction line of a ceramic refractory construction.

DETAILED DESCRIPTION OF INVENTION

It is the object of the present invention to utilize refractory albeit frangible materials for the constriction of cracking reactor lines of a cracking furnace, such as silicon carbide or other ceramics, refractory materials including composite materials, that can operate at much higher temperatures than present high alloy steels, and in so doing, to drastically reduce the cracking line length to as low as 20 feet of fired length. This not only reduces the firebox size but also gives greater selectivity toward olefinic products, including ethylene, because of the very short residence time that reduces secondary, ethylene degradation reactions.

The above objects and others are achieved by means of an array of single pass cracking lines, each comprised of an inlet pipe coaxially suspended within a tube so as to define an annular space there between which is communicated to the inlet pipe interior space by the spaced apart area between the lower open end of the pipe and the lower closed end of the tube, such that this reaction line structure has both a top inlet and a top outlet for hydrocarbon flow. Each such cracking line comprises a tube and pipe structure wherein both are constructed of a ceramic refractory material and the pipe is suspended within the tube such that the lower open end of the pipe is spaced apart form the lower closed end of the tube and an annular space exists between the exterior surface of the pipe and the interior surface of the tube. This arrangement is possible because the upper open end of the inlet pipe, coming from the hydrocarbon plus steam convection bank of the furnace, leads down through a quench section defined by that annular space existing between this portion of the inlet pipe and coaxial tube positioned outside of the furnace firebox area where hot effluent within the cracking tube is quenched in an annulus surrounding the inlet pipe. The inlet pipe then continues down into the radiant box surrounded by an annulus defined by the exteriorly located directly fired cracking tube. The inlet pipe is thus a centrally located feeding pipe to a larger diameter cracking and quench tube that is capped or closed near the bottom of the firebox. The vaporized feedstock and steam mixture leaving the convection section of the furnace is first raised in temperature by heat exchange with the tube effluent flowing countercurrently upward in the surrounding annular space that is contiguous with and an extension of the cracking tube. As the inlet pipe carries on down into the radiant heating firebox its hydrocarbon and steam content is heated still further and at least partially cracked by the heat in the upward flowing reactant mixture in the surrounding annulus of the cracking tube.

Figures 1, 2:
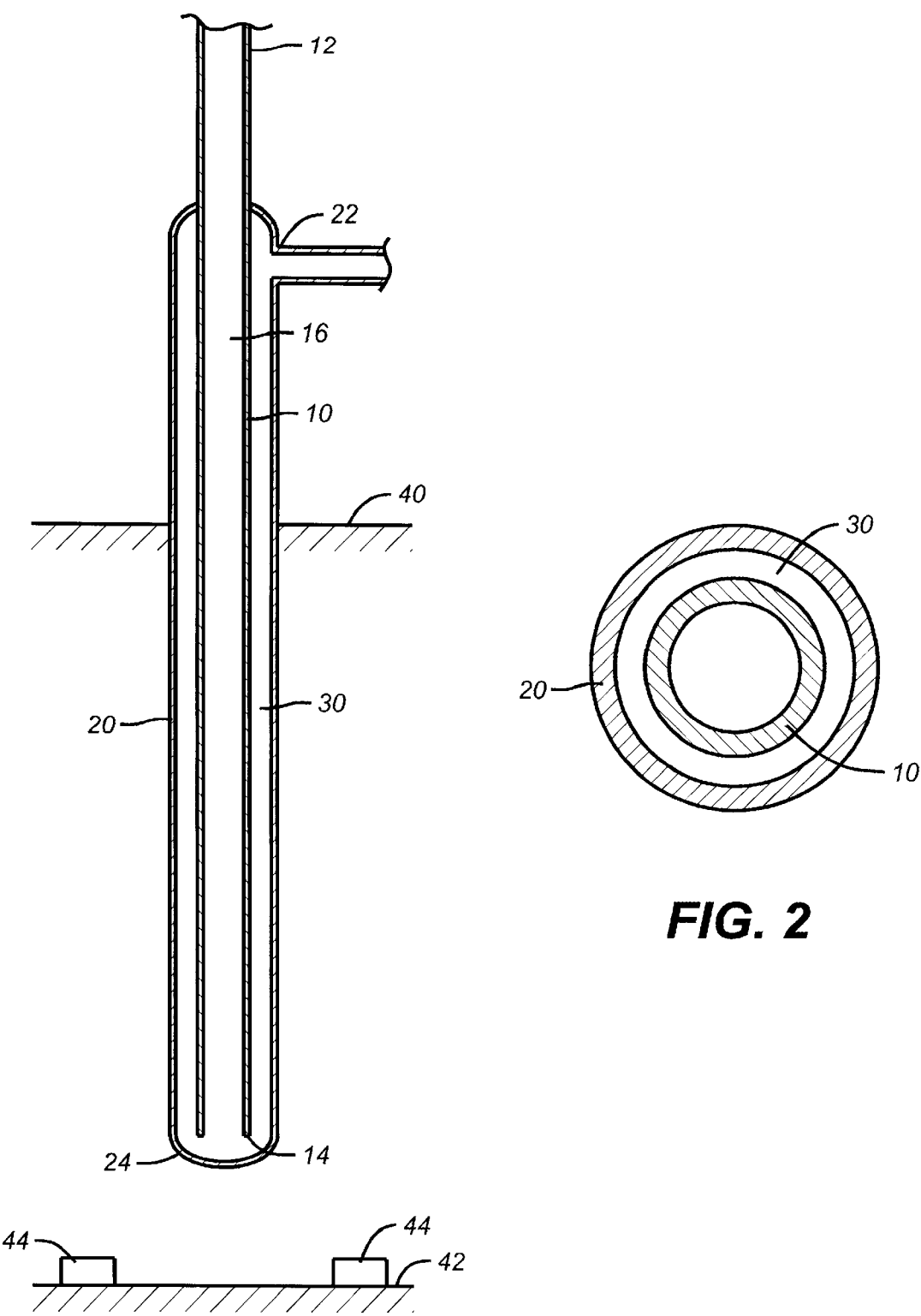
FIG. 1 schematic illustrates, by a side section view, a pipe and tube structure which comprises a quenching-cracking reaction line of this invention as such line is in part located within and without the radiant heating volume of a fire box of a cracking furnace, to define thereby a quenching zone and a cracking reaction zone.
FIG. 2 is a cross section view of the pipe and tube structure taken along line 2—2 of FIG. 1.

With reference to FIGS. 1 and 2, the ceramic refractory tube and pipe structure is illustrated. As before noted the ceramic pipe 10 has a first and second open end, 12 and 14 respectively, and is coaxially located within an exterior ceramic refractory tube 20 having a first open end 22 and a second closed end 24 so as to define an annular space 30 therebetween which communicates the interior passage 16 of pipe 10 through that area wherein the second end 14 of the pipe is spaced away from the second closed end 24 of the tube. In FIG. 1, the limits of the firebox are indicated as 40 and 42 and the fire box is illustrated as having floor mounted burners 44.

The lower end of the inlet pipe is located just above the capped lower end of the cracking and quench tube. The partially cracked reactants of the inlet pipe must male a 180 degree turn as they issue from the bottom of the inlet pipe and pass upwardly into the surrounding annulus of the cracking tube. This type of abrupt change of direction is generally to be avoided in cracking reactor lines of a metallic construction, because it would be susceptible to erosion by coke particles or be a place where coke spall could accumulate to plug off flow. In the present design, however, the inlet pipe, being at an early part of the cracking line pathway, would not coke significantly in normal usage so that erosion by coke particles would not occur. Pluggage by spalled coke from cracking within the annulus space of the ceramic cracking tube is avoided by leaving enough space between the cracking tube bottom cap and the end of the inlet pipe. In addition, the use of non-metallic refractory materials such as silicon carbide for construction of for the cracking tube and inlet pipe greatly reduces the coking tendency in the first instance.

The reaction mass of steam and partially cracked hydrocarbons leaving the inlet pipe lower open end reverses its flow direction and passes upwards in the annular cracking tube and continuously rises in temperature as heat is absorbed into this annular space from the burner heated refractory firebox. Because this cracking tube reaction mass is flowing counter-currently with the cooler inlet pipe feed contents as the cracking tube reaction mass annular flow travels to the top of the radiant fire box, a peak temperature is reached in the top half of the cracking tube annulus inside the radiant fire box. However, with the continued high heat flux from the burners, the cracking temperature profile only flattens rather than droops.

When the annulus zone reactions product exits the firebox it immediately becomes the cooled section of a quench exchanger, cooled by the downward flowing incoming steam and hydrocarbon mixture in the central inlet pipe. Quenching of the reaction products may proceed up to the limit imposed by the temperature of the hydrocarbon and steam mixture leaving the convection section of the furnace, which might be typically 1200° F. or less, so that quenching to the 1400° F. level or lower can be anticipated of the reacted hydrocarbon mass in the pipe-tube annulus. Further quenching of the reaction effluent to recover waste heat would be done in conventional transfer line exchanger(s).

Figure 3:
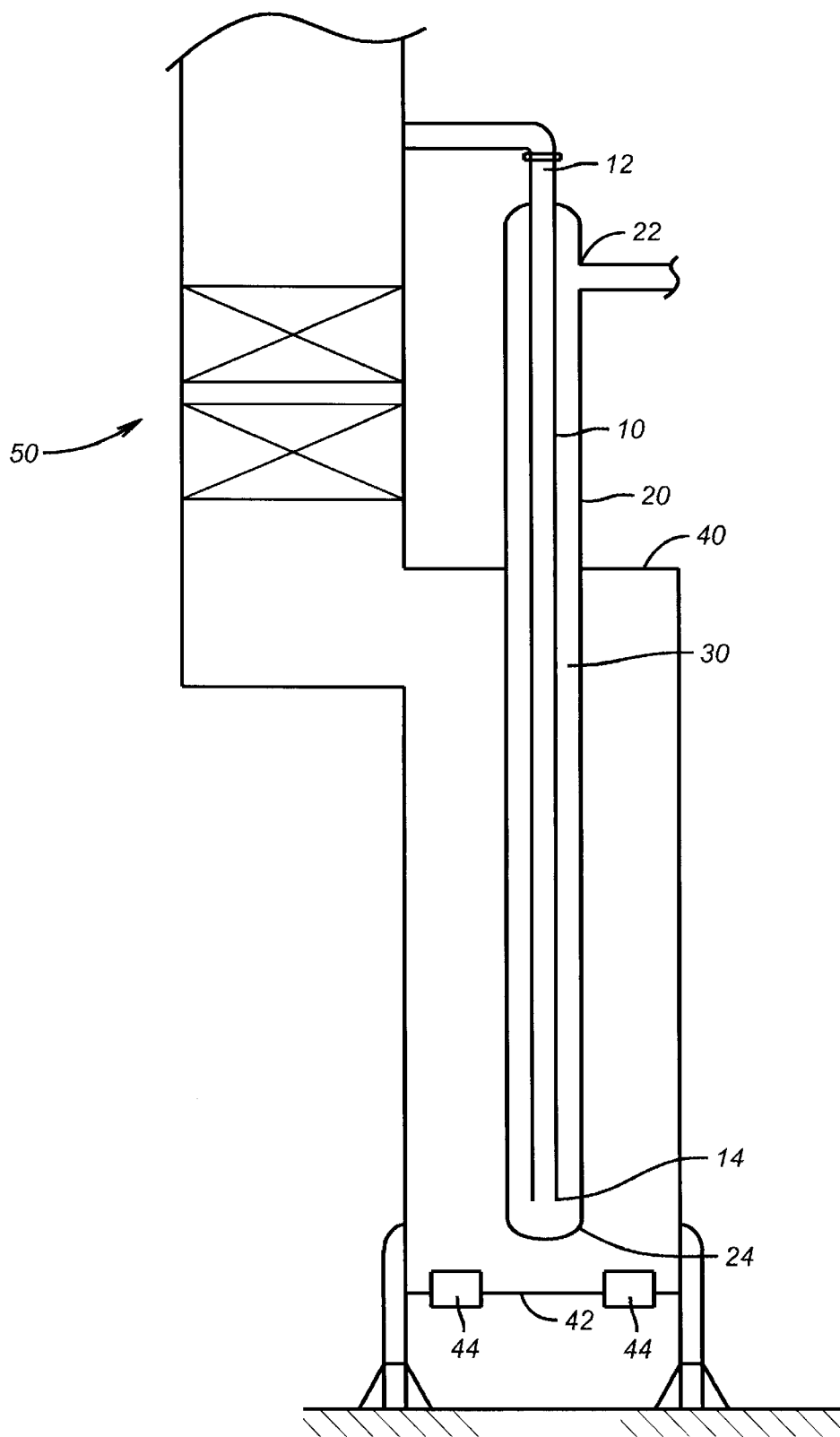
FIG. 3 schematically illustrates by side section view a furnace comprising an upper convention section wherein saturated hydrocarbon feedstock is preheated and dilution steam is raised to a super-heated state, a quenching-cracking reaction line of this invention, and a lower radiant heating firebox section with a suspension of a pipe and tube structure in part without and in part within the radiant heating section so as to define the quenching and the cracking zones of such line.
Figure 4:
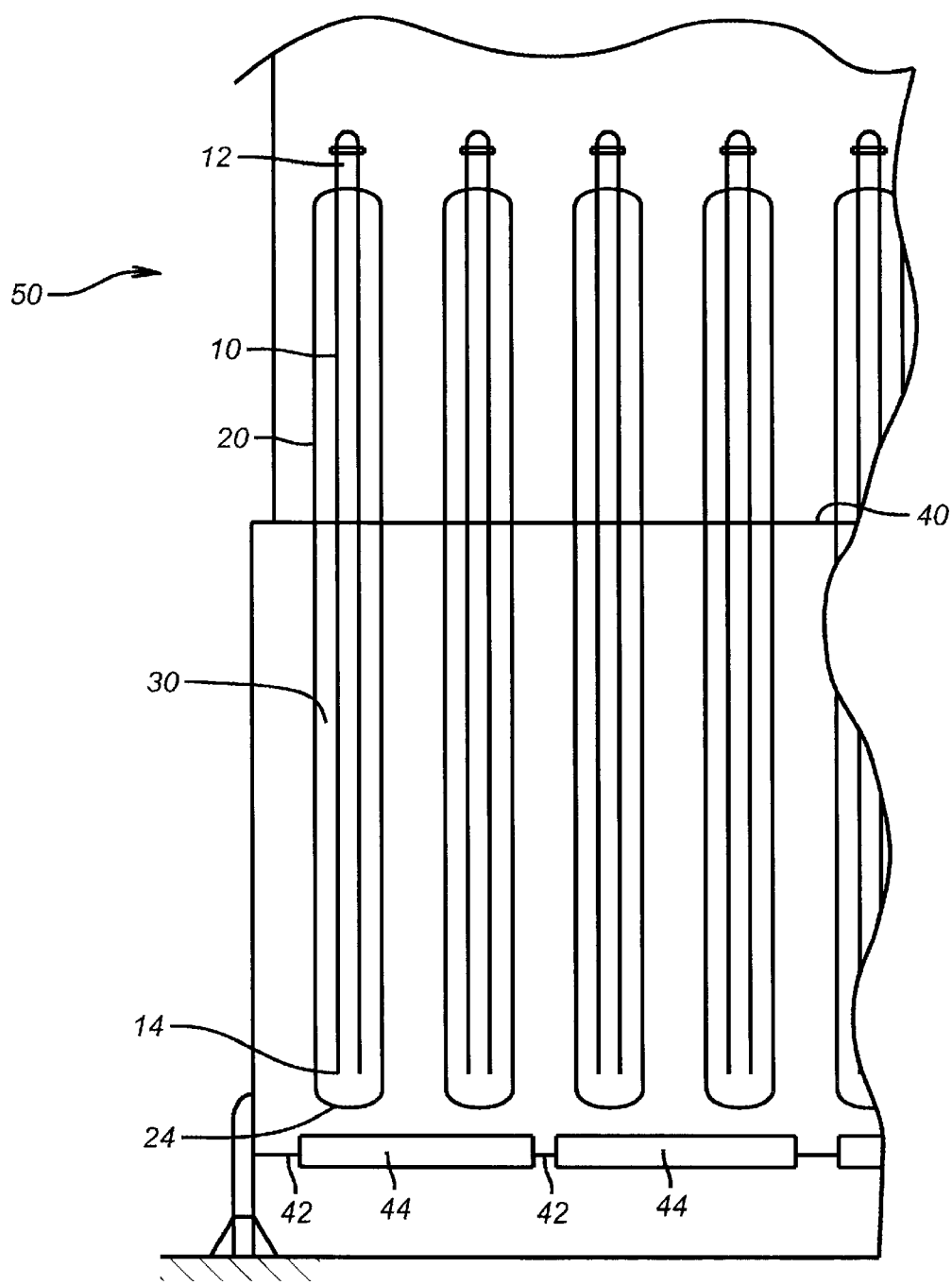
FIG. 4 schematically illustrates, in a front sectional view, a firebox as in FIG. 3 and an array of multiple pipe and tube structures there within and without.

FIGS. 3 and 4 illustrate by side and front section view an array of multiple ceramic tube and pipe structures as positioned within and without the firebox limits, 40 and 42 respectively, of a furnace comprising a firebox section and a convection section 50.

Apart from the use of high temperature refractory materials with noncatalytic surfaces to minimize coke in the first place, one of the main attributes of the present design is that it has a straight-through configuration in the areas that would normally be expected to have coke deposits, specifically the high temperature end of the cracking line pathway and the primary quench exchange. Because of these features, the tendency for erosion to occur (from high velocity coke particles attritted from the reaction system walls) will be very much less than in a usual cracking furnace, with the net result that higher than normal throughputs of hydrocarbon and steam can be used.

Another attribute of the present single inlet pipe and annular cracking tube design is the inherent strength of the cracking tube construction compared with a straight-through cracking tube such as a top inlet and bottom outlet design. A 20 foot cracking line would normally require an interior diameter (I.D.) of less than one inch, whereas the present design employs much larger tubes to house the annular cracking space, such as, for example, a three or four inch I.D. cracking tube. This, and the fact that the cracking tube is suspended and held only at its upper end, makes for a more rugged construction that is particularly applicable with the use of relatively brittle ceramic and/or refractory materials.

As a consequence of the refractory construction of inlet pipe-annular cracking tube which comprise the reaction lines of this invention, the firebox of the cracking furnace may be operated to temperatures several hundreds of degrees greater than the 2000 to 2100° F. level that is employed with cracking lines of a high alloy metallic construction.

The foregoing disclosure and description of the invention are illustrative and explanatory thereof, and various changes in the details of the illustrated apparatus and construction and method of operation may be made without departing from the spirit of the invention.

What is claimed is:

1. A cracking furnace, comprising a firebox containing a plurality of radiant burners;

a tube and pipe structure comprising an interior ceramic refractory pipe having a first and second open end;

an exterior ceramic refractory tube having a first open end, a second closed end and an interior surface defining its interior diameter; said interior ceramic refractory pipe having an exterior surface defining an outside diameter which is less than the interior diameter of said exterior ceramic refractory tube, said interior ceramic refractory pipe being suspended within said exterior ceramic refractory tube such that the second open end of said pipe is spaced apart from the second closed end of said tube and an annular space exists between the exterior surface of said pipe and the interior surface of said tube;

means for suspending said tube and pipe structure such that the second ends of said tube and pipe structure are within the fire box and the first open ends of said tube and pipe structure are outside of the firebox;

means for feeding a preheated hydrocarbon containing feed stock gas mixture to an interior space of said pipe through its first open end whereby said feed stock gas mixture passes to the second end of said pipe and then into the annular space existing between said pipe and said tube, and means for receiving a discharge of a cracked hydrocarbon product gas mixture from the first open end of said tube.

2. The cracking furnace of claim 1, wherein that portion of said pipe and tube structure suspended outside the fire box is of a length sufficient to provide for heat exchange between the preheated hydrocarbon containing feed stock gas mixture and the discharge of cracked hydrocarbon product gas mixture such that said product gas mixture discharges from said tube and pipe structure at a temperature no greater than 1500° F.

\* \* \* \* \*